United States Patent
Servos

[11] 3,794,017
[45] Feb. 26, 1974

[54] AUTOMATIC VELOCITY COMPONENT SELECTOR FOR ELECTRONYSTAGMOGRAPHS

[76] Inventor: Gerald H. Servos, 21 W. 254 Crescent Blvd., Glen Ellyn, Ill. 60137

[22] Filed: Jan. 8, 1971

[21] Appl. No.: 104,936

[52] U.S. Cl............................................. 128/2.1 R
[51] Int. Cl............................................. A61b 5/05
[58] Field of Search..... 128/2 N, 2 S, 2 T, 2 R, 2 Z, 128/2.1 R, 2.1 B

[56] References Cited
UNITED STATES PATENTS

| | | | |
|---|---|---|---|
| 3,563,231 | 2/1971 | Ducote et al. | 128/2.1 R |
| 3,123,768 | 3/1964 | Burch et al. | 128/2.1 B |
| 3,217,706 | 11/1965 | Sullivan | 128/2.1 R |
| 3,000,271 | 9/1961 | Harvey et al. | 128/2.1 R |
| 3,258,008 | 6/1966 | Durand | 128/2.1 R |
| 2,902,030 | 9/1959 | Kennedy et al. | 128/2.1 R |

OTHER PUBLICATIONS
Korn, G. A. et al. Electronic Analogue Computers, McGraw–Hill 1956, 2nd Ed. Copy in Scientific Library (QA 76.4 K6), pp. 13 & 415.

*Primary Examiner*—Kyle L. Howell
*Attorney, Agent, or Firm*—Alter Weiss Whitesel & Laff

[57] ABSTRACT

An improved apparatus for recording the velocity components in electronystagmographs. The eye position signals obtained from sensors attached to a patient undergoing nystagmus tests are coupled to a differentiator. The output of the differentiator is attached, through switch means, to a pen actuated recorder to provide an analog recording of the velocity derivative under desired test conditions. Means are provided to readily set the pen to zero at a mid-graph location, at a top-graph location and at a bottom-graph location thereby enabling the positive and negative velocity components to be shown on the entire graph scale.

7 Claims, 3 Drawing Figures

PATENTED FEB 26 1974 3,794,017

INVENTOR
GERALD H. SERVOS

BY
Alter, Weiss and Whitesel
ATTORNEYS

AUTOMATIC VELOCITY COMPONENT SELECTOR FOR ELECTRONYSTAGMOGRAPHS

This invention relates to apparatus used for measuring nystagmus responses in the human body and more particularly to apparatus for automatically recording the velocity component of nystagmus movement.

It is now recognized in the diagnostic medicinal field that the phenomena known as nystagmus can be used to ascertain vestibular disorders. There is apparatus presently available which records the relative position of a patients eyeballs under conditions of induced or spontaneous nystagmus.

Nystagmus may be induced by many known methods. This invention is not concerned with the method of inducing the nystagmus; but, is concerned with the apparatus utilized in recording the velocity of the movement of the eyeball and is especially concerned with apparatus for recording the slow components of the velocity of the movement of the eyeball. More particularly, it has been found that under conditions of nystagmus, the eyeball will move relatively slowly to the right or to the left and then move at a much higher velocity towards the starting eyeball position. That is, the eyeball oscillates under induced nystagmus conditions, moving to the right or left side of the eye cavity in the cranium. When the eyeball reaches the limit of such movement, it moves back towards the starting position at a relatively high rate of speed.

The known methods of measuring the eyeball velocity record the position of the eyeball on graph paper against a time base. Technicians then compute the slope of the trace on the graph paper to determine the time differential of the position; which is of course the velocity. The technician performing the test has to determine the velocity of the eyeball under nystagmus conditions when the eyeball is moving to the right and when the eyeball is moving to the left. Thus, in the known and used velocity computing procedure, there is a wide latitude for error because of the relatively larger number of individually performed steps.

Accordingly, an object of this invention is to provide direct velocity readings derived from the analog position signals denoting the position of the eyeballs and to ascertain whether the analog signals are caused by stimulating the left tympanic membrane with a colder condition, the right tympanic membrane with a colder condition, the left tympanic membrane with a warmer condition, and the right tympanic membrane with a warmer condition.

A related object of the present invention is to provide for full scale reading when the pen movement is to the left and a full scale reading when the pen movement is to the right. This requires changing the zero position of the pen from a mid-graph location to a top or bottom graph location.

Yet another object of the invention is to automatically differentiate the positional signal to obtain the velocity signal.

Still another object of the invention is to differentiate the positional signal and read only the positive output of the differentiator.

A related object of the invention is to automatically select the tympanic membrane bath temperature.

Yet another related object of the invention is to zero the pen at the bottom of the scale when only the positive signals are read and to zero the pen at the top of the scale for a zero location when only the negative signals are read.

The above mentioned and other objects and features of this invention will become more apparent from a description of the apparatus in the following specification taken in conjunction with the accompanying drawings, wherein: -

Figure 1:
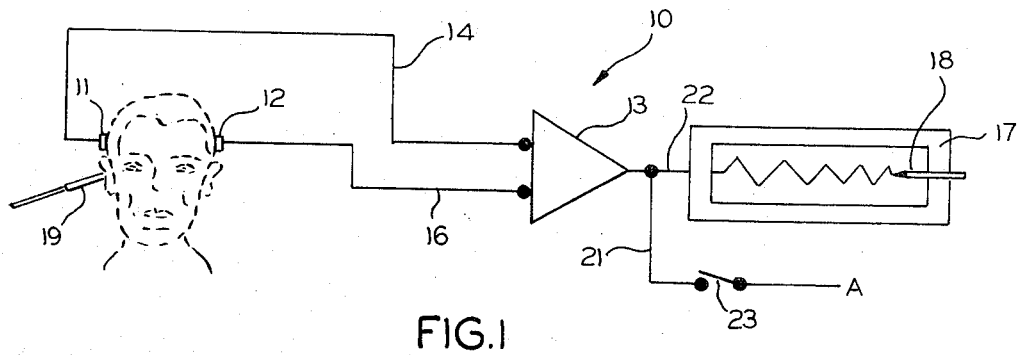
FIG. 1 is a block diagram showing of the apparatus utilized for taking positional readings of the eyeballs along a horizontal axis under conditions of induced nystagmus.

Turning now to the drawings, FIG. 1 shows in block diagram form apparatus, generally designated as 10 for recording the position of the eyeball under nystagmus. More particularly, means are provided for sensing the cornea-retina potential difference at the patients temples. For example, electrodes 11 and 12 are fastened by means, such as adhesive tape, to the patient. The patient is shown in dotted lines in FIG. 1. In applying the electrodes, the skin surface of the patient is first cleaned with a solvent, such as alcohol, or the like, to degrease the skin. An electrically conducting jelly is then applied to the areas of placement of the sensors to reduce the contact resistance to minimal values. The electrodes are then fastened to the patient's head.

This example is given showing electrodes 11 and 12 for detecting the cornea-retina potentials difference. Electrodes can also be fastened above and below each eye to measure the vertical movements of the eyeballs. The operation of the invention would be as effective under such conditions as they are for the horizontal measurements described in detail hereinafter.

The output signal of each of the electrodes 11 and 12 are coupled to a high gain amplifier 13 through leads 14 and 16, respectively. The amplified output of the high gain amplifier is coupled to drive a recording oscillograph. Responsive to the receipt of the amplified signal from amplifier 13, the pen 18 of the oscillograph 17 is driven from its central zero location either upwardly or downwardly to provide a trace showing the position of the eyeball. When the eyeball is positioned so that the patient is looking directly forward, the pen should be in a zero location. Any movement of the eyes to the right or to the left produces a cornea-retinal potential that is a function of the distance the eyes have moved from the zero location.

The nystagmus condition is stimulated by causing a temperature differential between the tympanic membranes of the right and left ears. The temperature differential or caloric stimulation condition is obtained in many ways. One preferred method is to flood a selected ear canal with water at a desired temperature to stimulate the tympanic membrane of that ear. Each ear is stimulated with water at a temperature, either 7° C above or 7° C below the normal body temperature. The water that is at a temperature which is 7° C above the normal body temperature is called the hot temperature, and the water which is at a temperature 7° C below the normal body temperature is called the cold temperature.

The apparatus provided and described hereinafter records the elicited nystagmus automatically including the slow velocity component; i.e., the velocity of the eyeball in its travel from the original forward viewing point to the point at the edge of the eye socket.

Means are provided for stimulating the tympanic membrane. More particularly, water at the desired temperature is flushed into the selected ear through tube 19, subjecting the tympanic membrane to a differential temperature, and thereby causing nystagmus wherein the eye oscillates.

In the past, to obtain the velocity component, the trace recorded by the apparatus of FIG. 1 was analyzed to determine the slope of each portion of the trace. Since the recording has a time base on the abscissa, the slope of the curve or trace at any point is the time differential of the position or the velocity of the eyeball.

Means are provided for utilizing the output of amplifier 13 to automatically differentiate the signal obtained from the amplifier 13. More particularly, lead 21 is coupled directly to the lead 22 that connects amplifier 13 to recorder 17. A switch 23 may be provided to connect point A to the output of amplifier 13.

Figure 2:
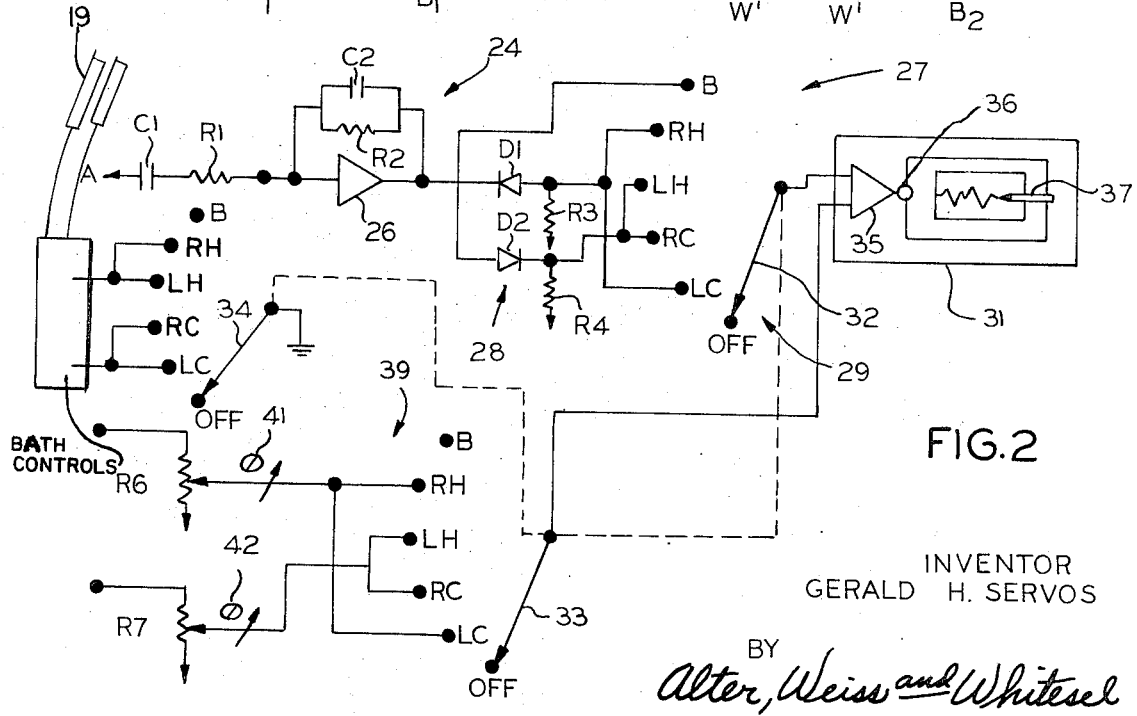
FIG. 2 is a schematic showing of apparatus utilized to record the velocity outputs obtained by differentiating the positional signals obtained by the apparatus of FIG. 1.

Means are provided for differentiating the signal from amplifier 13. More particularly, point A is coupled to a differentiating circuit, shown generally as circuit 24 in FIG. 2. The coupling occurs through a series capacitance resistance coupling network, wherein capacitor C1 is in series with resistor R1 at the input of operational amplifier 26. The operational amplifier is converted to a differentiator by utilizing the bridged RC feedback network, comprising a bridged capacitor C2 and parallel resistor R2 connecting the input and the output of operational amplifier 26.

Means are provided for connecting the differentiated output of amplifier 26 to the recorder. More particularly, switch means 27 comprising a diode network, generally shown as 28, and a multi-level rotary switch generally shown as 29 are used to couple the differentiated output to the oscillograph recorder 31. The oscillograph recorder 31 can be recorder 17 switched over to receive the output from switch means 29. The switch means 29 comprises a plurality of simultaneously operated rotors, such as rotors 32, 33, and 34. The switch has an off position, a left cold position, a right cold position, a left hot position, a right hot position and a both position. Rotor 32 is the rotor which couples the differentiated signal into the power amplifier 35. Rotor 33 is the rotor which couples a bias voltage into a power amplifier 35 in oscillograph recorder 31 to cause the pen motor 36 to move the pen 37 to a zero location on the chart paper. Rotor 34 actuates a water bath temperature selector relay to automatically select the desired temperature of the water used.

The output of operational amplifier 26 is coupled directly to the both position of stator 38. When the tympanic membrane of the left ear of the patient is stimulated by the cold water, only negative signals are elicited from the differentiator during the time the eye travels toward the end of the socket. Note that the velocity in that direction is the slow component. Similarly, when the tympanic membrane of the right ear of the patient is stimulated with hot water, only negative signals are forthcoming from the operational amplifier, while the eye is traveling toward the end of the socket. In other words, the slow component of the velocity is measured.

To assure that only the negative signals are picked up during the period of the test wherein the left ear is supplied with cold water, or the right ear is supplied with hot water, the stator positions of the switch RH and LC are tied together and coupled through negative going diode D1 to the output of the operational amplifier 26. A biasing resistor R3 connected from the common point of stator position RH and LC to ground is provided. Thus, only negative signals are coupled to the oscillograph recorder when switch rotor 32 is connected to positions LC and RH of stator 38.

In a similar manner, when the right ear is stimulated with cold water, and the left ear is stimulated with hot water, the positive signals emitted by the operational amplifier 26 represents the slow component of the velocity of the eye during nystagmus. The eye moving in the direction toward the end of the eyeball cavity generates a positive signal of the sensors. A positive going diode D2 is thus connected to the point common to switch positions RC and LH on stator 38. A biasing resistor R4 is provided at this common point.

Wipers 32, 33 and 34 move simultaneously. Thus, when wiper 33 moves to stator position LC on stator 39, then the power amplifier 35 of the recorder 31 is positively biased to drive the pen 37 toward the top of the graph paper. In one preferred embodiment, the pen is zeroed within five millimeters of the top edge of the graph paper. Thus, any negative signals received through wiper 32 can utilize the entire scale of the recorder. Similarly, when wiper 33 is connected to position RC or LH on stator 39, then the power amplifier 35 is biased negatively to drive the pen 37 within five millimeters of the bottom of the paper; thereby, providing a complete full scale reading for the positive signals received through the diode D2.

It should be noted that the positive voltages are coupled to the common stator position, RH and LC of stator 39 through a variable resistor R6, which can be varied by moving the associated wiper up and down for vernier control of the zero pen position by any well known means, such as the screw driver adjustment 41. Similarly, the negative bias voltage can be varied utilizing variable resistor R7 through means such as screw driver adjustment 42.

Figure 3:
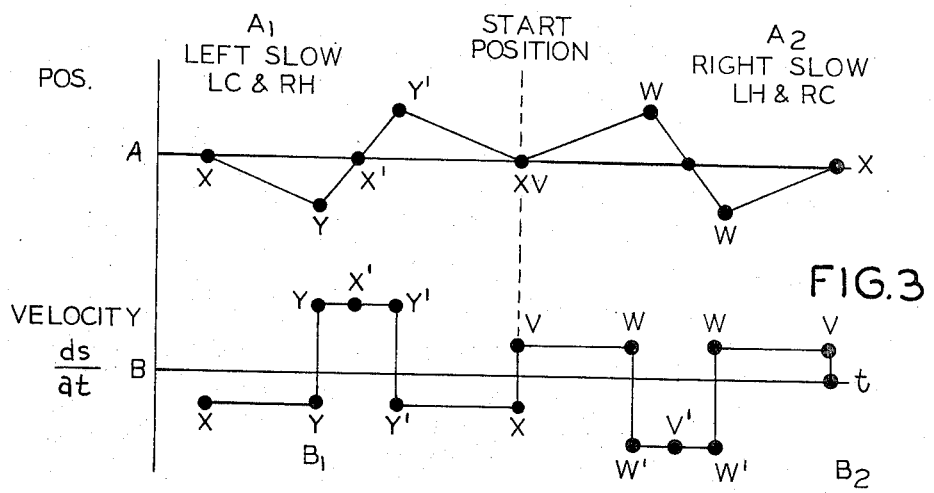
FIG. 3 is a graphic showing of the position and velocity components obtained from the equipment of FIG. 1 and FIG. 2, respectively.

FIG. 3 shows an idealized form of the curves of the recorder 17 at A and of the recorder 31 at B. The abscissas of both graphs is the time axis since the recorder paper is moved synchronously from its roll. The nystagmus conditions results in the movement of the eyeball which is recorded positionally on recorder 17, as shown in Graphs A1 and A2. Therein, the position of the eye is shown as it moves from the start position, shown as X or V, respectively, to one end of the eye socket, shown as Y or W, respectively. After reaching the end, the eye returns to its start position. This is shown as points X', V', respectively. The eye continues to move to the other end of the socket, shown as position Y'. Then, it returns to the start point X.

The velocity component of this movement is shown by the curve traced on recorder 31 and is idealized in curves B1, B2. Therein, the line portions XY and VW, respectively represent a first velocity that is equal to the slope of line portions XY and VW, respectively of curves A1, A2, respectively. The line portion XY is a relatively slow velocity component. The slope of curve A1 then reverses to a positive slope represented by line portion YY' of curve A1; which is the relatively fast velocity component. At point Y' of curve A1, the slope once again changes to a negative slope equal in value to the line segment or portion Y'X of curve A1. The slope of line portion Y'X is smaller than the slope of the previous portion of the line positions YY'. Curve A1 thus represents the left slow and fast velocity component. Similarly, the line portions VW W'V represents slow velocity components and are positive while line portion W'W' represents a negative fast velocity component.

The curves shown in FIG. 3B are the curves when both positive and negative signals are coupled from the differentiator 24 to recorder 31. The portion of curves B1, B2 labeled XY, Y'X and W'W' are the portions of the curve that would be shown when only the negative signals are allowed through diode D1; that is, when wiper 32 is either on position RC or position LC of stator 38. In that case, the offset control of stator 39 would be used to adjust the positive biasing voltage to drive the pen up to within 5 millimeters of the top of the scale at its zero position. Thus, the entire width of the paper is then used to demonstrate the exact velocities being recorded. Similarly, when the portions YY', VW and W'V are being recorded; i.e., when the wiper 32 is connected to position RC and LH of stator 38, then diode D2 allows only the positive signals through. At that time, the offset control 42 is operated and the negative biasing is connected to the power amplifier 34 in the oscillograph to drive the pen to within five millimeters of the bottom of the scale at its zero position. A full scale reading of the velocity represented by the line portions YY', VW and W'V are thus obtained.

In operation, the patient sits in a chair with the sensors attached, as previously described. The potential generated in the movement of the patient's eyes is first checked out by directing the patient to look first at an originating spot or light, and subsequently to spots or lights 10° on either side of the first originating spot (or light), thereby causing the patient's eyes to move a calibrated distance. This provides an absolute indication of the voltages through the system during the movement of the eye. This calibration may also be accomplished after the testing; then switch 29 is placed in the "off" position.

Initially, the switch is set to the "B" position. Neither tympanic membrane is stimulated; instead, the patient is told to close his eyes and his head is moved to several attitudes. Recordings are also made. This measurement acts to determine spontaneous nystagmus.

Now caloric tests are made. The head is placed on a 30° angle and the patient sits in the chair and cold water, 7° C below his body temperature, is applied through the tube 19 to his left ear. The velocity recorder is connected into the system through switch 23. By operating switch means 27 so that wipers 32, 33 and 35 are on position LC, and inundating the left ear a direct velocity reading is obtained corresponding to portion XY on curve B of FIG. 3, except that the pen 37 is centered at the top of the graph paper.

When the cold water supply is used to flood the right ear, the velocity is again measured. The new portion VW of B2 is read directly on oscillograph 31 with pen 37 zeroed juxtaposed to the bottom of the graph paper.

The left ear is then supplied with hot water. The switch means is switched to the LH position. Once again, the velocity is read directly. This time it is represented by portion VW of curve B2 of FIG. 3. The pen is zeroed at the bottom of the page. Then, the hot water is supplied to the right ear to stimulate the right tympanic membrane and once again elicit nystagmus condition in the patient. This time, the switch is in the RH position, and the pen is positioned at the top of the page.

Thus, it is seen that the system provides a unique and foolproof apparatus which can be reliably operated by ordinary technicians. It does not require any special training or skill to operate the equipment.

While the principles of the invention have been described above in connection with specific apparatus and applications, it is to be understood that this description is made only by way of example and not as a limitation on the scope of the invention.

I claim:

1. An improved apparatus for automatically measuring the eyeball velocity characteristics of a patient under conditions of nystagmus by applying distinct hot and cold temperature differentials to the tympanic membranes of the patient for diagnosing vestibular disorders, said apparatus comprising selecting means for inducing mystagmus in a patient by applying distinct ones of said hot and cold temperature differentials in a sequential manner, means for sensing the cornea-retina voltages indicative of the movement of the patient's eyes across the eye sockets, amplifying means for amplifying said voltages, velocity converting means for automatically converting said voltages to velocity indications, said velocity converting means comprising differentiating means for differentiating said voltages, and said selecting means also simultaneously coupling, the output of said differentiating means to indicating means, said selecting means further comprising means for coupling only the slow velocity components of each of said velocity indications to said indicating means under the distinct ones of said hot or cold differentials.

2. The improved apparatus of claim 1 wherein differentiating means comprises operational amplifier means, parallel resistor-capacitor network means for interconnecting the input and the output of said operational amplifier, and series resistor-capacitor network means for coupling said voltages to the input of said operational amplifier.

3. The improved apparatus of claim 1 wherein said indicating means comprises recording means, said recording means comprising a movable media for recording indications thereon, pen means for making indications on said media, motor means for moving said pen means transverse to the movement of said media as a function of the output of said differentiating means, and said selecting means comprising switching means for coupling the output of said differentiating means of said motor means at each of said variety of conditions.

4. The apparatus of claim 3 wherein said means for coupling only said slow velocity component to said pen motor means comprises diode means coupled between said selecting means and the output of said differentiator.

5. The apparatus of claim 4 wherein said diode means comprises a first diode to pass positive signals and block negative signals, said selecting means having switching positions including left cold, right cold, left hot, right hot and both positions in accordance with the said variety of conditions, said first diode coupled between the output of said differentiator and the right cold and left hot positions of said switch when the left tympanic membrane of the patient is exposed to the hot temperature and the right tympanic membrane of the patient is exposed to the cold temperature.

6. The apparatus of claim 5 wherein said means for coupling only the slow velocity component to said pen motor means comprises a second diode positioned to pass negative signals and block positive signals, said second diode coupled between the output of said differentiator and the switching positions of said switch when the left tympanic membrane of the patient is exposed to the cold temperature and when the right tympanic membrane of the patient is exposed to the hot temperature.

7. The improved apparatus of claim 6 wherein means are provided for normally positioning said pen motor approximately at the mid point of said media when the velocity is zero, and means for positioning said pen at the opposite extremes of said media when the output of said differentiating means is coupled to said recorder means through said positive and negative going diode, respectively.

* * * * *

UNITED STATES PATENT OFFICE
CERTIFICATE OF CORRECTION

Patent No. 3,794,017　　　　　　　　　　Dated February 26, 1974

Inventor(s) Gerald H. Servos

It is certified that error appears in the above-identified patent and that said Letters Patent are hereby corrected as shown below:

IN THE SPECIFICATION

Col. 6, line 24; after "ing" change "mystagmus" to --nystagmus--.

Signed and sealed this 13th day of August 1974.

(SEAL)
Attest:

McCOY M. GIBSON, JR.　　　　　　C. MARSHALL DANN
Attesting Officer　　　　　　　　Commissioner of Patents